(12) United States Patent
Naito et al.

(10) Patent No.: US 8,026,137 B2
(45) Date of Patent: Sep. 27, 2011

(54) PRODUCTION METHOD OF A CAPACITOR

(75) Inventors: Kazumi Naito, Chiba (JP); Katutoshi Tamura, Chiba (JP)

(73) Assignee: Showa Denko K.K., Tokyo (JP)

( * ) Notice: Subject to any disclaimer, the term of this patent is extended or adjusted under 35 U.S.C. 154(b) by 895 days.

(21) Appl. No.: 10/576,416

(22) PCT Filed: Oct. 19, 2004

(86) PCT No.: PCT/JP2004/015762
§ 371 (c)(1),
(2), (4) Date: Nov. 29, 2006

(87) PCT Pub. No.: WO2005/038834
PCT Pub. Date: Apr. 28, 2005

(65) Prior Publication Data
US 2007/0141745 A1     Jun. 21, 2007

Related U.S. Application Data

(60) Provisional application No. 60/513,590, filed on Oct. 24, 2003.

(30) Foreign Application Priority Data

Oct. 20, 2003   (JP) ................................. 2003-359086

(51) Int. Cl.
*H01L 21/8242*   (2006.01)

(52) U.S. Cl. ..... 438/239; 438/99; 257/40; 257/E21.008; 257/E27.048; 29/25.03; 361/523

(58) Field of Classification Search ................... 361/510, 361/523, 524, 525; 438/99, 238, 239; 257/303, 257/306, 301, 532, 40, E21.008, E27.048; 29/25.03
See application file for complete search history.

(56) References Cited

U.S. PATENT DOCUMENTS

| 4,780,796 | A   |   | 10/1988 | Fukuda et al.     |         |
|-----------|-----|---|---------|-------------------|---------|
| 4,943,892 | A   | * | 7/1990  | Tsuchiya et al. ..............| 361/525 |
| 6,088,218 | A   |   | 7/2000  | Hamada et al.     |         |
| 6,361,572 | B1  | * | 3/2002  | Igaki et al. ...................| 29/25.03 |
| 6,660,188 | B1  | * | 12/2003 | Ohata et al. ....................| 252/500 |
| 6,671,168 | B2  | * | 12/2003 | Yoshida et al. ...............| 361/523 |
| 2002/0191367 | A1 | * | 12/2002 | Sakai et al. ....................| 361/302 |
| 2003/0007318 | A1 | * | 1/2003  | Kojima et al. ................| 361/510 |
| 2003/0133256 | A1 | * | 7/2003  | Yoshida et al. ...............| 361/523 |

FOREIGN PATENT DOCUMENTS

| JP | 63-29919 A | 2/1988 |
| JP | 63-34917 A | 2/1988 |
| JP | 4-74853 B2 | 11/1992 |

(Continued)

*Primary Examiner* — Matthew Landau
*Assistant Examiner* — Latanya N Crawford
(74) *Attorney, Agent, or Firm* — Sughrue Mion, PLLC (57) ABSTRACT

A method for producing a capacitor having a good capacitance appearance factor and a low ESR comprising, as one electrode (anode), an electric conductor having pores and having formed on the surface thereof a dielectric layer and, as the other electrode (cathode), a semiconductor layer formed on the electric conductor by energization in an electrolytic solution, the method comprising impregnating pores with a semiconductor layer-forming precursor before energization to render the concentration of semiconductor layer-forming precursor in pores higher than that of semiconductor layer-forming precursor in the electrolytic solution; a capacitor produced by the method; and an electronic circuit and an electronic device using the capacitor.

25 Claims, 1 Drawing Sheet

FOREIGN PATENT DOCUMENTS

| | | |
|---|---|---|
| JP | 5-121273 A | 5/1993 |
| JP | 7-22080 B2 | 3/1995 |
| JP | 2826341 B2 | 11/1998 |
| JP | 11074157 A | 3/1999 |
| JP | 11-274007 A | 10/1999 |
| JP | 2003243258 A | 8/2003 |

* cited by examiner

1

PRODUCTION METHOD OF A CAPACITOR

CROSS REFERENCE TO THE RELATED APPLICATIONS

This is an application filed pursuant to 35 U.S.C. Section 111(a) with claiming the benefit of U.S. Provisional application Ser. No. 60/513,590 filed Oct. 24, 2003 under the provision of 35 U.S.C. Section 111(b), pursuant to 35 U.S.C. Section 119(e)(1).

TECHNICAL FIELD

The present invention relates to a method for producing a capacitor having a good capacitance appearance factor and low ESR.

BACKGROUND ART

A capacitor used in a circuit associated with the central processing unit (CPU) in personal computers and the like is required to have high capacitance and low ESR (equivalent series resistance) in order to prevent the fluctuation of voltage and reduce the generation of heat at the passing of a high ripple current. In general, an aluminum or tantalum solid electrolytic capacitor is used.

The solid electrolytic capacitor is constituted by an aluminum foil having fine pores in the surface layer or a tantalum powder sintered body having fine pores in the inside, which is serving as one electrode (electric conductor), a dielectric layer formed on the surface layer of the electrode, and the other electrode (usually a semiconductor layer) provided on the dielectric layer.

The ratio of the semiconductor layer formed on the dielectric layer is indicated by impregnation ratio, which is defined as a ratio (percentage) of the capacitance when a semiconductor layer is formed, assuming that the capacitance appearing when an electrolytic solution is impregnated in place of a semiconductor is 100%.

One of the methods for forming a semiconductor layer on the dielectric layer is a method of forming a semiconductor layer by energization. For example, a method of forming a semiconductor layer comprising a metal oxide by passing a direct current (Japanese Patent No. 1,985,056), a method of obtaining a semiconductor layer comprising an electrically conducting compound by passing an alternating current (Japanese Patent No. 2,826,341), or a method of obtaining a semiconductor layer comprising an electrically conducting polymer by contacting a separately prepared external electrode on a previously-provided chemical polymerization layer and by passing a direct current (Japanese Patent No. 1,988,457).

DISCLOSURE OF THE INVENTION

Figure 1:
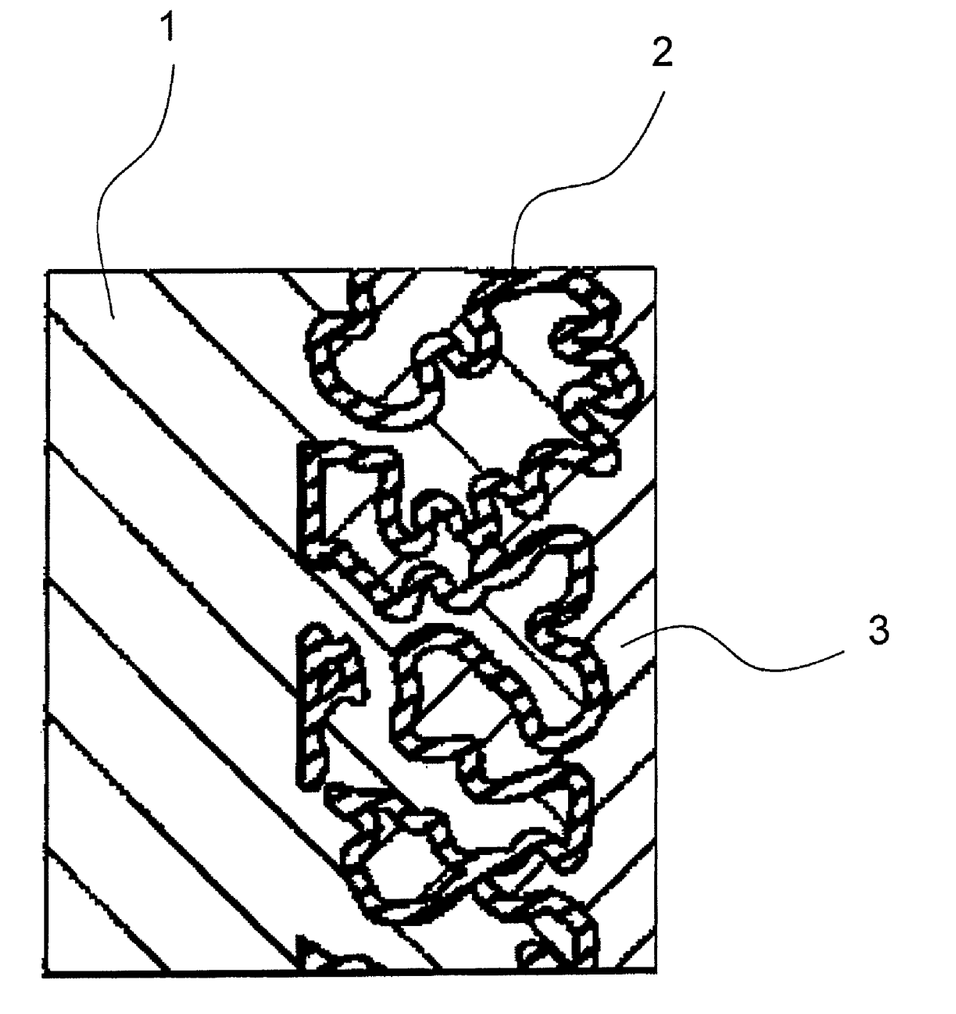
The figure shows a capacitor in accordance with the invention, including anode 1, dielectric layer 2 and cathode 3.

According to the methods of Japanese Patent Nos. 1,985, 056 and 2,826,341, good ESR may be obtained, but a long time is necessary to form a semiconductor layer and the impregnation ratio cannot be increased within a normal time.

The method of Japanese Patent No. 2,826,341 is disadvantageous in that counter electrodes are necessary for simultaneously forming semiconductor layers on multiple electric conductors on an industrial scale and the semiconductor layer attaches also to the counter electrodes.

The method of Japanese Patent No. 1,988,457 is disadvantageous in that when applied to the case of simultaneously forming semiconductor layers on multiple electric conductors, in the case where the chemical polymerization layer is thin, the semiconductor layer must be rendered thick by energization, but due to energization from an external electrode, the semiconductor layer formed on the electric conductor surface layer assembly inhibits the semiconductor layer-forming precursor from diffusing into the pore inside of the electric conductor and some semiconductor layers cannot be successfully formed by energization, whereas in the case where the chemical polymerization layer is thick, the semiconductor layer tends to be easily formed by energization, but a good ESR value is not obtained because a thick chemical polymerization layer is formed.

Accordingly, a method for producing a capacitor improved in ESR and increased in capacitance is demanded.

As a result of intensive investigations to solve those problems, the present inventors have found that such problems can be overcome by impregnating pores with a semiconductor layer-forming precursor before energization to render the concentration of semiconductor layer-forming precursor in pores higher than that of semiconductor layer-forming precursor in an electrolytic solution and in this state, by passing a current in the electrolytic solution. The present invention has been accomplished based on this finding.

That is, the present invention relates to the following production method of a capacitor and also to a capacitor produced by the production method.

1. A method for producing a capacitor comprising, as one electrode (anode), an electric conductor having pores and having formed on the surface thereof a dielectric layer and, as the other electrode (cathode), a semiconductor layer formed on the electric conductor by energization in an electrolytic solution, the method comprising impregnating pores with a semiconductor layer-forming precursor before energization to render the concentration of semiconductor layer-forming precursor in pores higher than that of semiconductor layer-forming precursor in the electrolytic solution.

2. The method for producing a capacitor as described in 1 above, wherein the electrolytic solution is an electrolytic solution not containing a semiconductor layer-forming precursor.

3. The method for producing a capacitor as described in 1 above, wherein the electric conductor is at least one member selected from a metal, an inorganic semiconductor, an organic semiconductor and carbon or a mixture thereof.

4. The method for producing a capacitor as described in 1 above, wherein the electric conductor is a laminated body having, as the surface layer, at least one member selected from a metal, an inorganic semiconductor, an organic semiconductor and carbon, or a mixture thereof.

5. The method for producing a capacitor as described in 3 or 4 above, wherein the electric conductor is a metal or alloy mainly comprising at least one member selected from tantalum, niobium and aluminum, or a niobium oxide.

6. The method for producing a capacitor as described in any one of 1 to 5 above, wherein the electric conductor is tantalum having a CV value of 100,000 µF·V/g or more.

7. The method for producing a capacitor as described in any one of 1 to 5 above, wherein the electric conductor is niobium having a CV value of 150,000 µF·V/g or more.

8. The method for producing a capacitor as described in any one of 1 or 3 to 7 above, wherein the electric conductor has a size of 5 $mm^3$ or more.

9. The method for producing a capacitor as described in any one of 1 or 3 to 8 above, wherein the electric conductor has a foil shape and the depth of pore formed by etching is 200 μm or more.

10. The method for producing a capacitor as described in 1 above, wherein the dielectric layer mainly comprises at least one member selected from metal oxides such as $Ta_2O_5$, $Al_2O_3$, $TiO_2$ and $Nb_2O_5$.

11. The method for producing a capacitor as described in 1 or 2 above, wherein the semiconductor layer-forming precursor is at least one member selected from an aniline derivative (raw material of polyaniline), a phenol derivative (raw material of polyoxyphenylene), a thiophenol derivative (raw material of polyphenylene sulfide), a thiophene derivative (raw material of polythiophene), a furan derivative (raw material of polyfuran) and a pyrrole derivative (raw material of polypyrrole or polymethylpyrrole).

12. The method for producing a capacitor as described in 11 above, wherein the semiconductor layer-forming precursor is pyrrole or 3,4-ethylenedioxythiophene.

13. The method for producing a capacitor as described in 1 or 2 above, wherein the semiconductor layer-forming precursor is a compound which is oxidized or reduced by energization and becomes an inorganic semiconductor.

14. The method for producing a capacitor as described in 1 above, wherein the semiconductor layer is at least one member selected from an organic semiconductor layer and an inorganic semiconductor layer.

15. The method for producing a capacitor as described in 14 above, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyano-quinodimethane, and an organic semiconductor mainly comprising an electrically conducting polymer obtained by doping a dopant into a polymer containing a repeating unit represented by the following formula (1) or (2):

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

16. The method for producing a capacitor as described in 15 above, wherein the electrically conducting polymer containing a repeating unit represented by formula (1) is an electrically conducting polymer containing a structure unit represented by the following formula (3) as a repeating unit:

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

17. The method for producing a capacitor as described in 16 above, wherein the electrically conducting polymer is selected from polyaniline, polyoxyphenylene, polyphenylene sulfide, polythiophene, polyfuran, polypyrrole, polymethylpyrrole, and substitution derivatives and copolymers thereof.

18. The method for producing a capacitor as described in 17 above, wherein the electrically conducting polymer is poly(3,4-ethylenedioxythiophene).

19. The method for producing a capacitor as described in 14 above, wherein the inorganic semiconductor is at least one compound selected from molybdenum dioxide, tungsten dioxide, lead dioxide and manganese dioxide.

20. The method for producing a capacitor as described in any one of 14 to 19 above, wherein the electrical conductivity of the semiconductor is from $10^{-2}$ to $10^3$ S/cm.

21. A capacitor produced by the production method described in any one of 1 to 20 above.

22. The capacitor as described in 21 above, wherein the impregnation ratio of the semiconductor is 90% or more.

23. An electronic circuit using the capacitor described in 21 or 22 above.

24. An electronic device using the capacitor described in 21 or 22 above.

Embodiments of the production method of a capacitor and the capacitor of the present invention are described below.

Examples of the electric conductor for use in the present invention include at least one member selected from a metal, an inorganic semiconductor, an organic semiconductor and carbon, a mixture thereof, and a laminated body obtained by stacking such an electric conductor as the surface layer.

Examples of the metal for use in the present invention include a metal or alloy mainly comprising at least one member selected from tantalum, niobium and aluminum.

Examples of the inorganic semiconductor include metal oxides such as lead dioxide, molybdenum dioxide, tungsten dioxide, niobium monoxide, tin dioxide and zirconium monoxide. Examples of the organic semiconductor include electrically conducting polymers such as polypyrrole, polythiophene, polyaniline and substitution product or copolymer having such a polymer backbone, and low molecular complexes such as complex of tetracyanoquinodimethane and tetrathiotetracene, and tetracyanoquinodimethane (TCNQ) salt. Examples of the laminated body obtained by laminating an electric conductor as the surface layer include laminated bodies where the above-described electric conductor is laminated on paper, insulating polymer, glass or the like.

In the case of using a metal as the electric conductor, for the purpose of improving the capacitor properties, for example, for reducing the LC value, the metal may be used after subjecting a part thereof to at least one treatment selected from carbidation, phosphation, boronation, nitridation and sulfidation.

The electric conductor is not particularly limited in its shape and may have a foil-, plate- or bar-like shape or an electric conductor in a powder form may be used after shaping it or shaping and then sintering it. Also, the electric conductor may be subjected to a surface treatment such as etching to have fine pores. In particular, a powder electric conductor in the form of a sintered body and an electric conductor surface-treated to have fine pores and thereby increased in the surface area are preferred because the capacitance per unit volume of the capacitor is increased. In the case of shaping or shaping and then sintering a powder electric conductor, fine pores can be provided inside the shaped or sintered electric conductor by appropriately selecting the pressure at the shaping.

The method of the present invention is effective particularly when applied to an electric conductor which is difficult to be impregnated with the semiconductor, that is, an electric conductor having fine pores with a large-depth. For example, as for the electric conductor having a sintered body shape, the method of the present invention is effective when applied to an electric conductor having a size of 5 $mm^3$ or more and having a CV value (product of capacitance and electrochemical voltage when measured with an electrolytic solution) of 100,000 $\mu F \cdot V/g$ or more in the case of a sintered body of a tantalum metal powder material or having a CV value of 150,000 $\mu F \cdot V/g$ or more in the case of a sintered body of a niobium metal powder material. As for the electric conductor having an etched foil shape, the method of the present invention is effective when applied to an electric conductor having a CV value of 1,000 $\mu F \cdot V/cm^2$ or more where pores having a depth of 200 $\mu m$ or more are produced by etching.

It is possible to directly connect an outgoing lead wire to the electric conductor. In the case of shaping or shaping and then sintering a powder electric conductor, a part of a separately prepared outgoing lead (lead wire or lead foil) may be shaped together with the electric conductor and the outgoing lead outside the shaped portion may be used as the outgoing lead of one electrode of the capacitor.

Examples of the dielectric layer formed on the surface of the electric conductor of the present invention include a dielectric layer mainly comprising at least one member selected from metal oxides such as $Ta_2O_5$, $Al_2O_3$, $TiO_2$ and $Nb_2O_5$, or a dielectric layer conventionally known in the field of ceramic capacitors or film capacitors. In the case of the former dielectric layer mainly comprising at least one member selected from metal oxides, when the dielectric layer is formed by electrochemically forming an electric conductor having a metal element of the metal oxide in an electrolytic solution containing a mineral acid or an organic acid, the obtained capacitor becomes an electrolytic capacitor having a polarity. Examples of the dielectric layer conventionally known in the field of ceramic or film capacitors include dielectric layers described in JP-A-63-29919 (the term "JP-A" as used herein means an "unexamined published Japanese patent application") and JP-A-63-34917. The dielectric layer mainly comprising at least one member selected from metal oxides or the dielectric layer conventionally known in the field of ceramic or film capacitors may be used by laminating a plurality of these layers. Also, the dielectric layer may be a mixture of the dielectric layer mainly comprising at least one member selected from metal oxides and the dielectric layer conventionally known in the field of ceramic or film capacitors.

On the dielectric layer, a semiconductor layer is formed by energization in an electrolytic solution and used as the other electrode. In the present invention, it is important as a pretreatment for increasing the degree of forming a semiconductor layer to impregnate pores with a semiconductor layer-forming precursor before energization and render the concentration of semiconductor layer-forming precursor in pores higher than that of semiconductor layer-forming precursor in the electrolytic solution.

The semiconductor layer-forming precursor is a raw material substance which becomes a semiconductor by energization. For example, in the case of an organic semiconductor which is described later, this is a raw material monomer or oligomer and in the case of an inorganic semiconductor, a compound which is oxidized or reduced by energization and becomes an inorganic semiconductor. Two or more kinds of semiconductor layer-forming precursors may be used. Also, one or more dopant which is described later (for example, a known dopant such as arylsulfonic acid or its salt, alkylsulfonic acid or its salt, various polymer sulfonic acids or salts thereof, and a compound having the above-described substituent) may be added together with the semiconductor layer-forming precursor.

Examples of the methods for impregnating the pores of an electric conductor having formed on the surface thereof a dielectric layer with the semiconductor layer-forming precursor include a method of impregnating with a solution obtained by dissolving the semiconductor layer-forming precursor in an appropriate solvent. After impregnation, the electric conductor is left standing in air or dried to arbitrarily control the amount of solvent, whereby the concentration of semiconductor layer-forming precursor in pores of the electric conductor can be rendered high. The solvent may be completely dissipated. In the case where the semiconductor layer-forming precursor is a liquid at room temperature or when heated, the pores may be impregnated with the liquid wherein the solvent is completely dissipated.

In conventional methods of forming a semiconductor layer by energization in an electrolytic solution, the concentration of semiconductor layer-forming precursor in pores of the electric conductor is almost equal to the concentration of semiconductor layer-forming precursor in the electrolytic solution, because the electric conductor is dipped in an electric solution having dissolved therein the semiconductor layer-forming precursor and then a current is passed. However, as described above, in the present invention pores are impregnated with the semiconductor layer-forming precursor to a high concentration before energization and therefore, the concentration of semiconductor layer-forming precursor in pores is higher than the concentration of semiconductor layer-forming precursor in the electrolytic solution. When a semiconductor layer is formed by energization in the state that the concentration of semiconductor layer-forming precursor in pores of the electric conductor is higher, the semiconductor is formed in pores in a larger amount as compared with conventional methods, as a result, the impregnation ratio of the semiconductor in the produced capacitor can be successfully as high as 87% or more, preferably 90% or more.

In the case of simultaneously forming semiconductor layers on multiple electric conductors on an industrial scale, water is used for the solvent of the electrolytic solution by taking account of safety such as no occurrence of fire at energization, and the method of the present invention can exert a great effect at the time of using a semiconductor layer-forming precursor having a low solubility in water, for example, a precursor for forming an organic semiconductor. In one example, when a semiconductor layer comprising an electrically conducting polymer is formed by using a monomer such as pyrrole or 3,4-ethylenedioxythiophene, the solubility of monomer in water is relatively low. In such a case, the monomer is previously dissolved in a solvent such as alcohol in which the monomer has high solubility, and pores of the electric conductor are impregnated with the solvent before energization, and the alcohol is then dissipated to allow a large amount of monomer to remain in pores, and the semiconductor layer is subsequently formed by energization in an electrolytic solution using water as the solvent, whereby a semiconductor layer having a good impregnation ratio can be formed.

Examples of the semiconductor formed by energization after impregnating pores with a semiconductor layer-forming precursor in advance of energization include at least one compound selected from an organic semiconductor and an inorganic semiconductor is used.

Specific examples of the organic semiconductor include an organic semiconductor mainly comprising an electrically conducting polymer obtained by doping a dopant to a polymer containing a repeating unit represented by the following formula (1) or (2):

(1)

(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a ring.

The electrically conducting polymer containing a repeating unit represented by formula (1) for use in the present invention is preferably an electrically conducting polymer containing a structure unit represented by the following formula (3) as a repeating unit:

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is electrically charged and a dopant is doped therein. The dopant is not particularly limited and a known dopant can be used.

Examples of the polymer containing a repeating unit represented by formulae (1) to (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Examples of the polymer semiconductor layer-forming precursor containing a repeating unit represented by formulae (1) to (3) include an aniline derivative, a phenol derivative, a thiophenol derivative, a thiophene derivative, a furan derivative and a pyrrole derivative. Among these, preferred are pyrrole, 1-methylpyrrole, 3-methylpyrrole and 3,4-ethylenedioxythiophene.

Specific examples of the inorganic semiconductor include at least one compound selected from molybdenum dioxide, tungsten dioxide, lead dioxide and manganese dioxide, etc. Specific examples of the inorganic semiconductor layer-forming precursors include lead acetate, manganese acetate, sodium molybdate and sodium tungstate.

When the organic or inorganic semiconductor used has an electrical conductivity of $10^{-2}$ to $10^3$ S/cm, the capacitor produced can have a small ESR value and this is preferred.

The above-described semiconductor layer is formed by pure chemical reaction (solution reaction, gas phase reaction or a combination thereof) without performing an energization operation, formed by energization or formed by a combination of these methods, but in the present invention, energization is employed at least once in the process of forming the semiconductor layer.

One example of the method for forming this semiconductor layer on the electric conductor is described below. The electric conductor impregnated with a semiconductor layer-forming precursor is dipped in a separately prepared semiconductor layer-forming solution and by using the electric conductor as the anode or by disposing an external electrode in contact with or in the vicinity of the electric conductor and using it as the anode, a current is passed to a cathode plate disposed in the semiconductor layer-forming solution, whereby the semiconductor layer is formed. The energization method includes a constant voltage method, a constant current method and a combination thereof, but in the case of forming semiconductor layers by simultaneously passing a current to multiple electric conductors, a constant current method is preferred because the semiconductor layer can be stably formed.

The energization time and predetermined current value vary depending on, for example, the kind, size and density of the electric conductor used, the kind and thickness of the dielectric layer formed, or the kind of the semiconductor layer formed and therefore, these are determined by performing a preliminary experiment. As one technique for the preliminary experiment, the advisability of the predetermined constant current value can be judged by controlling the mass of the semiconductor layer. Examples thereof include a method of previously plotting the mass of semiconductor against energization time at respective constant current values and selecting the constant current value when the plot reaches a saturated value and the mass of the semiconductor becomes maximum.

When a constant current method is used, the initial voltage value at the energization is a value determined by the predetermined constant current value. In the case of forming a dielectric layer by the above-described electrochemical formation, the initial voltage value sometimes exceeds the electrochemical formation voltage.

A current is passed to the semiconductor layer-forming solution in which raw materials working out to the semiconductor after energization and, if desired, the above-described dopant (for example, a known dopant such as arylsulfonic acid or its salt, alkylsulfonic acid or its salt, various polymer sulfonic acids or salts thereof, and a compound having the above-described substituents) are dissolved, whereby the semiconductor layer is formed on the dielectric layer.

In the present invention, pores of the electric conductor can be impregnated with the semiconductor layer-forming precursor to a high concentration before energization and therefore, raw materials working out to the semiconductor may not be necessarily contained in the semiconductor layer-forming solution.

As for the temperature and pH of the semiconductor layer-forming solution, conditions for facilitating the formation of semiconductor layer are decided by performing a preliminary experiment. But in some cases, the energization is preferably performed at a low temperature so as to prevent the deterioration of the semiconductor layer-forming solution due to air oxidation. The cathode plate disposed in the semiconductor layer-forming solution is used as the counter cathode at the energization and an electrically conducting material, particularly, a metal foil or plate is used therefor. In the case of simultaneously forming semiconductor layers on multiple electric conductors, it is preferred to locate multiple cathode plates electrically connected to at least one power supply part and dispose these cathode plates so that the electric power can be uniformly distributed using the cathode plates to all of the multiple electric conductors dipped in the semiconductor layer-forming solution.

The semiconductor layer-forming solution may be used after stirring it to provide a uniform solution or may be used without stirring. The vessel in which the semiconductor layer-forming solution is used may be designed to a size which allows the semiconductor layer-forming solution to always flow out or to a size larger than the volume of the semiconductor layer-forming solution.

In the present invention, in order to repair fine defects of the dielectric layer generated resulting from formation of the semiconductor layer, re-electrochemical formation (when the dielectric layer is not formed by electrochemical formation, first electrochemical formation) may be performed after energization. Also, the energization and re-electrochemical formation may be repeated multiple times and the energization conditions may be changed among repeated energization treatments. When the energization is stopped, the electric conductor is usually pulled out from the semiconductor layer-forming solution and washed and dried, but after the steps of energization—stop of energization—washing—drying are performed multiple times, the re-electrochemical formation step may be started. Although the reasons are not clearly known, the mass of semiconductor sometimes increases when energization—stop of energization—washing—drying are repeated, compared to the case of continuously performing the energization with the same energization time. When energization is performed multiple times, pores of the electric conductor are preferably impregnated with the semiconductor layer-forming precursor before each energization or before arbitrary energization.

The re-electrochemical formation can be performed in the same manner as in the method described above for forming the dielectric layer by electrochemical formation. The re-electrochemical formation is performed at a voltage of the electrochemical formation voltage or lower.

In the present invention, an electrode layer is provided on the semiconductor layer formed by the above-described method or the like. The electrode layer can be formed, for example, by solidification of an electrically conducting paste, plating, vapor deposition of a metal, or adhesion of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers. The electrically conducting paste applied is then solidified by allowing it to stand in air or under heating. The thickness of the electrically conducting paste after being solidified is usually from about 0.1 μm to about 200 μm per layer.

The electrically conducting paste usually contains electrically conducting powder in an amount of 40 to 97 mass %. If the content is less than 40 mass %, the electrical conductivity of the electrically conducting paste produced is small, whereas if it exceeds 97 mass %, the electrically conducting paste may disadvantageously cause adhesion failure. The electrically conducting paste may be used by mixing therewith powder of the above-described electrically conducting polymer or metal oxide for forming the semiconductor layer.

Examples of the plating include nickel plating, copper plating, silver plating, gold plating and aluminum plating. Examples of the metal vapor-deposited include aluminum, nickel, copper, silver and gold.

Specifically, for example, an electrically conducting layer is formed by sequentially stacking a carbon paste and a silver paste on the electric conductor where the semiconductor layer is formed and thereby an electrode layer is formed.

In this way, a capacitor element where layers up to the electrode layer are stacked to form the cathode layer is produced.

The capacitor element of the present invention having such a constitution is jacketed, for example, by resin mold, a resin case, a metallic jacket case, resin dipping or a laminate film and thereby can be completed as a capacitor product for various uses. Among these, a chip capacitor jacketed by resin mold is preferred, because reduction in the size and in the cost can be simply attained.

As for the kind of the resin used in the resin mold jacketing, known resins for use in the molding of a solid electrolytic capacitor such as epoxy resin, phenol resin and alkyd resin can be employed, however, in each kind of resin used, low-stress resin generally available on the market is preferable because the molding stress of the resin on the capacitor element, which is generated at the molding, can be mitigated. The production machine for performing the molding with resin is preferably a transfer machine.

The thus-produced capacitor may be subjected to an aging treatment so as to repair the thermal and/or physical deterioration of the dielectric layer, which is caused at the formation of an electrode layer or at the jacketing. The aging is performed by applying a predetermined voltage (usually, within 2 times the rated voltage) to the capacitor. The optimal values of aging time and temperature vary depending on the kind and capacitance of a capacitor and the rated voltage and therefore, these values are determined by previously performing an experiment, but the aging time is usually from several minutes to several days and the aging temperature is usually 300° C. or less by taking account of heat deterioration of the voltage-applying jig. The aging may be performed in the air or in a gas atmosphere such as Ar, $N_2$ or He and may be performed under reduced pressure, atmospheric pressure or increased pressure, but when the aging is performed while or after supplying water vapor, the stabilization of the dielectric layer sometimes proceeds. Examples of the method for supplying water vapor include a method of supplying water vapor from a water reservoir placed in the aging furnace by using the heat.

As for the method of applying a voltage, an arbitrary current such as direct current, alternating current having an arbitrary waveform, alternating current superposed on direct current, and pulse current can be designed to pass. It is also possible to once stop the application of voltage during aging and again apply a voltage.

The capacitor produced according to the present invention can be preferably used for circuits requiring a high-capacitance and low ESR capacitor, such as a central processing circuit and a power source circuit. These circuits can be used in various digital devices such as a personal computer, server, camera, game machine, DVD equipment, AV equipment and cellular phone, and electronic devices such as various power sources. The capacitor produced according to the present invention has high capacitance and good ESR performance and therefore, by using this capacitor, electronic circuits and electronic devices having good performances can be obtained.

BEST MODE FOR CARRYING OUT THE INVENTION

The present invention is described in greater detail below by referring to Examples, but the present invention is not limited to these Examples.

Example 1

By using and shaping a tantalum powder having CV (product of capacitance and electrochemical voltage) of 140,000 μF·V/g together with a tantalum lead wire of 0.24 mmϕ, a sintered bodies in a size of 4.5×1.0×1.5 mm were produced (sintering temperature: 1,300° C., sintering time: 20 minutes, density of sintered body: 6.2 g/cm$^3$; the Ta lead wire was vertically embedded in the center part of the 1.0×1.5 mm face of the sintered body while being buried 4 mm inside the sintered body and protruding 10 mm outside).

On a separately prepared polyimide-made resin plate having a length of 250 mm, a width of 30 mm and a thickness of 2 mm (There are provided by printed wiring, on the front surface of the plate, a circuit connecting connection terminals for 32 electric conductors and respective anodes of current regulative diodes and reaching the power supply terminal in the left side of plate, and on the back surface, a circuit electrically connected only to the connection terminals for electric conductors on the front surface and reaching the power supply terminal for electrochemical formation in the right side of the plate through rectifier diodes), lead wires of the 32 sintered bodies produced above were aligned and connected at equal intervals and in equal dimensions while leaving blank a portion of 30 mm on left and right sides. After preparing 20 sheets of such a resin plate, the plates were arrayed in parallel at intervals of 5 mm and disposed on a metal-made frame to take the electrical connection at 15 mm on left and right sides of the resin plate (the center parts of left and right sides of the frame are electrically insulated from each other and the left and right power supply terminals, the former being provided on the front and the latter on the back of the resin plate, are insulated). In this way, 640 sintered bodies were disposed at equal intervals on the metal-made frame and each sintered body was electrically connected to the left and right power supply terminals provided on the metal-made frame through the lead wire. By taking a string of the sintered bodies on the metal-made frame as one lot, various operations were performed as follows.

The sintered bodies excluding a part of the lead wire were dipped in an aqueous 1% phosphoric acid solution and electrochemically formed at 80° C. for 8 hours while applying a voltage of 9 V between the lead wire serving as the anode and a Ta cathode plate disposed in the aqueous solution to form an oxide dielectric film layer comprising $Ta_2O_5$. The resulting sintered bodies excluding respective lead wires were dipped in a solution prepared by dissolving 30 g of ammonium molybdate and 200 g of nickel sulfate hexahydrate in 800 g of water and adding thereto 250 ml of 1N ammonium hydroxide, and electrolytically reacted at room temperature for 150 minutes while applying 2.2 V between the lead wire serving as the anode and a Ta plate as the cathode disposed in the solution. Thereafter, the sintered bodies were pulled up from the solution, washed with water, dried and then subjected to re-electrochemical formation at 8 V and 80° C. for 30 minutes in an aqueous 0.1% phosphoric acid solution. After the completion of the re-electrochemical formation, the sintered bodies were washed with water and dried.

The resulting sintered body excluding the lead wire was dipped in a 15% ethanol solution of 3,4-ethylenedioxythiophene monomer, pulled up and dried at 80° C. to dissipate the ethanol, thereby impregnating pores of the sintered body with the semiconductor layer-forming precursor.

Subsequently, the sintered bodies excluding respective lead wires were dipped in an electrolytic solution (semiconductor layer-forming solution) comprising 20% ethylene glycol and water, where ethylenedioxythiophene (used as an aqueous solution in which the monomer was in a saturated concentration or lower) and anthraquinonesulfonic acid were dissolved, and a direct constant current of 20 mA was passed for 30 minutes at room temperature between the lead wire and the negative tantalum electrode plate disposed in the electrolytic solution by utilizing the power supply terminal on the front surface left side of the metal-made frame, thereby performing energization for forming the semiconductor layer. The sintered bodies were pulled up, washed with water, then washed with ethanol, dried and subjected to re-electrochemical formation (80° C., 30 minutes, 8 V) for repairing LC (leakage current)-causing fine defects of the dielectric layer in an aqueous 1% phosphoric acid solution by utilizing the power supply terminal on the back surface right side of the metal-made frame. These impregnation of semiconductor layer-forming precursor, energization and re-electrochemical formation were repeated eleven times (last two energization treatments were performed for 60 minutes). Subsequently, the sintered bodies were washed with water and then with ethanol and dried to form semiconductor layers. Thereafter, a carbon paste and a silver paste were attached in this order on the semiconductor layer excluding the surface on which the lead wire was embedded, and dried to provide an electrode layer and thereby complete the cathode part. In this way, solid electrolytic capacitor elements were produced.

On upper surfaces of a pair of end parts of a separately prepared 100 μm-thick copper alloy lead frame (the surface thereof was copper-plated and further tin-plated thereon of an average thichkness of 1 μm and 7 μm respectively; 32 paired end parts each in a width of 3.4 mm were present and one end part of each pair was made to have a pocket with a step of 0.5 mm for fitting therein the electric conductor on which the electrode layer was formed; and when coplanarly projected, a gap of 1.0 mm was present between both end parts), cathode part faces (the face of 4.5 mm×1.5 mm) and anode lead wires (partially cut and removed) of the two solid electrolytic capacitor elements produced above were gaplessly laid by aligning respective directions and then electrically and mechanically connected by solidification of the same silver paste as the one used in the cathode part for the former and by spot-welding for the latter. Subsequently, the device was molded with epoxy resin by transfer molding while leaving outside a part of the lead frame, and the lead frame outside the resin was cut at a predetermined position and then bent along the jacket part. Thereafter, the jacket resin was cured at 185° C. and then the device was subjected to aging at 105° C. and 3.5 V for 4 hours to produce 320 chip solid electrolytic capacitors in a size of 7.3×4.3×1.8 mm.

Comparative Example 1

320 chip solid electrolytic capacitors were produced by forming the semiconductor layer in Example 1 without impregnating pores of the sintered body having formed thereon a dielectric layer with the semiconductor layer-forming precursor.

Example 2

An oxide dielectric film layer comprising $Nb_2O_5$ was formed through electrochemical formation at 23 V by using a niobium sintered body (made of powder having CV of 250,000 μF·V/g, nitrided amount: 11,000 ppm, amount of oxygen due to natural oxidation on the surface: 81,000 ppm, sintering temperature: 1,280° C., sintering time: 30 minutes, density of the sintered body: 3.4 g/cm$^3$) and a niobium lead wire in place of the tantalum sintered body and the tantalum lead wire in Example 1. Then, a series of operations, that is, the sintered bodies were dipped in an alcohol solution of 2% ethylenedioxythiophene, pulled up, left standing, dipped in an alcohol solution of 18% iron naphthalenesulfonate, pulled up, left standing at 40° C. for 30 minutes and dipped in alcohol, were repeated seven times. The sintered bodies were then subjected to re-electrochemical formation at 17 V and 80° C. for 30 minutes in an aqueous 0.1% acetic acid solution, washed with water and dried.

Subsequently, the sintered body excluding the lead wire was dipped in a 25% alcohol solution of 3,4-ethylenedioxythiophene monomer, pulled up and dried at 80° C. to dissipate the alcohol, thereby impregnating pores of the sintered body with the semiconductor layer-forming precursor.

Thereafter, the energization and re-electrochemical formation (14 V) were repeated in the same manner as in Example 1 to form a semiconductor layer and furthermore, the formation of a cathode layer and the aging (85° C., 6 V, 4 hours) were performed. In this way, 320 chip solid electrolytic capacitors were produced.

Comparative Example 2

216 Chip solid electrolytic capacitors (produced from 432 capacitor elements where the semiconductor layer was relatively successfully formed) were produced in the same manner as in Example 2 except that the concentration of the ethylenedioxythiophene alcohol solution used was changed to 20%, an operation of alternately dipping the sintered body in this solution and in an alcohol solution of 18% iron naphthalenesulfonate without further dipping it in alcohol was repeated 30 times to form a chemical polymerization layer on the electric conductor having provided thereon a dielectric layer, and the impregnation of pores of the sintered body with a semiconductor layer-forming precursor was not performed.

The capacitance, impregnation ratio, ESR value and LC value of each of the capacitors produced above were measured by the following methods. The measurement results (average values) are shown in Table 1.

Capacitance of the Capacitor:

The capacitance was measured at room temperature and 120 Hz by using an LCR measuring meter manufactured by Hewlett Packard, Ltd.

Impregnation Ratio:

This is a percentage of a numerical value obtained by dividing the capacitance of the capacitor by the capacitance of each electric conductor having formed thereon a dielectric layer as measured in 30% sulfuric acid.

ESR Value:

The equivalent series resistance of the capacitor was measured at room temperature and 100 kHz.

LC Value:

A predetermined rated voltage (2.5 V in Example 1 and Comparative Example 1, and 4 V in Example 2 and Comparative Example 2) was continuously applied between the terminals of the produced capacitor at room temperature for 30 seconds and thereafter, the LC value was measured.

TABLE 1

| | | Capacitance* (μF) | Impregnation ratio* (%) | ESR* (mΩ) | LC* (μA) |
|---|---|---|---|---|---|
| Examples | 1 | 1200 | 92 | 5 | 34 |
| | 2 | 464 | 93 | 12 | 30 |
| Comparative | 1 | 1110 | 85 | 9 | 38 |
| Examples | 2 | 370 | 74 | 29 | 42 |

*In Examples 1 and 2 and Comparative Example 1, an average of 320 capacitors.
In Comparative Example 2, an average of 216 capacitors.

As seen from comparison between Example 1 and Comparative Example 1 and between Example 2 and Comparative Example 2, when pores are impregnated with the semiconductor layer-forming precursor before energization for forming the semiconductor layer and the concentration of semiconductor layer-forming precursor in pores is rendered higher than the concentration of semiconductor layer-forming precursor in the electrolytic solution, a capacitor exhibiting a good capacitance appearance factor and a low ESR value can be obtained.

INDUSTRIAL APPLICABILITY

The present invention provides a method for producing a capacitor comprising, as one electrode, an electric conductor having pores and having formed on the surface thereof a dielectric layer and, as the other electrode, a semiconductor layer formed on the electric conductor by energization in an electrolytic solution, the method comprising impregnating pores with a semiconductor layer-forming precursor before energization to render the concentration of semiconductor layer-forming precursor in pores higher than the concentration of semiconductor layer-forming precursor in the electrolytic solution.

According to the present invention, a good capacitance appearance factor can be achieved and therefore, a capacitor having a good capacitance appearance factor and a low ESR can be obtained.

The invention claimed is:

1. A method for producing a capacitor comprising, as one electrode (anode), an electric conductor having pores and having formed on the surface thereof a dielectric layer and, as the other electrode (cathode), a semiconductor layer formed on the electric conductor from a semiconductor layer-forming precursor by energization in an electrolytic solution, the method comprising passing an electric current through the electrolytic solution to form the semiconductor layer on the electric conductor by energization in the electrolytic solution in a state in which the concentration of the semiconductor layer-forming precursor in the pores of the electric conductor is higher than the concentration of semiconductor layer-forming precursor in the electrolytic solution.

2. The method for producing a capacitor as claimed in claim 1, wherein the electrolytic solution is an electrolytic solution not containing a semiconductor layer-forming precursor.

3. The method for producing a capacitor as claimed in claim 1, wherein the electric conductor is at least one member selected from a metal, an inorganic semiconductor, an organic semiconductor and carbon or a mixture thereof.

4. The method for producing a capacitor as claimed in claim 1, wherein the electric conductor is a laminated body having, as the surface layer, at least one member selected from a metal, an inorganic semiconductor, an organic semiconductor and carbon, or a mixture thereof.

5. The method for producing a capacitor as claimed in claim 1, wherein the electric conductor is tantalum having a CV value of 100,000 µF·V/g or more.

6. The method for producing a capacitor as claimed in claim 1, wherein the electric conductor is niobium having a CV value of 150,000 µF·V/g or more.

7. The method for producing a capacitor as claimed in claim 1, wherein the electric conductor has a size of 5 mm³ or more.

8. The method for producing a capacitor as claimed in claim 1, wherein the electric conductor has a foil shape and the depth of pore formed by etching is 200 µM or more.

9. The method for producing a capacitor as claimed in claim 1, wherein the dielectric layer mainly comprises at least one member selected from metal oxides such as $Ta_2O_5$, $Al_2O_3$, $TiO_2$ and $Nb_2O_5$.

10. The method for producing a capacitor as claimed in claim 1, wherein the semiconductor layer-forming precursor is at least one member selected from an aniline derivative (raw material of polyaniline), a phenol derivative (raw material of polyoxyphenylene), a thiophenol derivative (raw material of polyphenylene sulfide), a thiophene derivative (raw material of polythiophene), a furan derivative (raw material of polyfuran) and a pyrrole derivative (raw material of polypyrrole or polymethylpyrrole).

11. The method for producing a capacitor as claimed in claim 1, wherein the semiconductor layer-forming precursor is a compound which is oxidized or reduced by energization and becomes an inorganic semiconductor.

12. The method for producing a capacitor as claimed in claim 1, wherein the semiconductor layer is at least one member selected from an organic semiconductor layer and an inorganic semiconductor layer.

13. The method for producing a capacitor as claimed in claim 1, which further comprises impregnating the pores of the electric conductor with a semiconductor layer-forming precursor before energization, immersing the impregnated electric conductor into the electrolytic solution, and then passing an electric current through the electrolytic solution to form the semiconductor layer on the impregnated electric conductor by energization in the electrolytic solution in a state in which the concentration of the semiconductor layer-forming precursor in the pores of the electric conductor is higher than the concentration of semiconductor layer-forming precursor in the electrolytic solution.

14. The method for producing a capacitor as claimed in claim 3, wherein the electric conductor is a metal or alloy mainly comprising at least one member selected from tantalum, niobium and aluminum, or a niobium oxide.

15. The method for producing a capacitor as claimed in claim 10, wherein the semiconductor layer-forming precursor is pyrrole or 3,4-ethylenedioxythiophene.

16. The method for producing a capacitor as claimed in claim 12, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyano-quinodimethane, and an organic semiconductor mainly comprising an electrically conducting polymer obtained by doping a dopant into a polymer containing a repeating unit represented by the following formula (1) or (2):

(1)

(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

17. The method for producing a capacitor as claimed in claim 12, wherein the inorganic semiconductor is at least one compound selected from molybdenum dioxide, tungsten dioxide, lead dioxide and manganese dioxide.

18. The method for producing a capacitor as claimed in claim 12, wherein the electrical conductivity of the semiconductor is from $10^{-2}$ to $10^3$ S/cm.

19. The method for producing a capacitor as claimed in claim 16, wherein the electrically conducting polymer containing a repeating unit represented by formula (I) is an electrically conducting polymer containing a structure unit represented by the following formula (3) as a repeating unit:

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

20. The method for producing a capacitor as claimed in claim 19, wherein the electrically conducting polymer is selected from polyaniline, polyoxyphenylene, polyphenylene sulfide, polythiophene, polyfuran, poly-pyrrole, polymethylpyrrole, and substitution derivatives and copolymers thereof.

21. The method for producing a capacitor as claimed in claim 20, wherein the electrically conducting polymer is poly (3,4-ethylenedioxythiophene).

22. A capacitor produced by the production method claimed in claim 1.

23. The capacitor as claimed in claim 22, wherein the impregnation ratio of the semiconductor is 90% or more.

24. An electronic circuit using the capacitor claimed in claim 22.

25. An electronic device using the capacitor claimed in claim 22.

* * * * *